(12) United States Patent
Razzell

(10) Patent No.: US 6,901,105 B1
(45) Date of Patent: May 31, 2005

(54) TRACKING OF A MULTI-PATH RESOLVED SIGNAL IN A RAKE RECEIVER

(75) Inventor: Charles John Razzell, Pleasanton, CA (US)

(73) Assignee: Koninklijke Philips Electroncs N.V., Eindhoven (NL)

( * ) Notice: Subject to any disclaimer, the term of this patent is extended or adjusted under 35 U.S.C. 154(b) by 831 days.

(21) Appl. No.: 09/649,672

(22) Filed: Aug. 28, 2000

(51) Int. Cl.[7] .............................................. H04B 1/707
(52) U.S. Cl. ...................................... 375/148; 375/150
(58) Field of Search ................................ 375/148, 150, 375/134, 320

(56) References Cited

U.S. PATENT DOCUMENTS

| | | | | |
|---|---|---|---|---|
| 4,991,147 A | * | 2/1991 | Remley et al. | 367/123 |
| 5,309,482 A | * | 5/1994 | Wright et al. | 375/350 |
| 6,047,017 A | * | 4/2000 | Cahn et al. | 375/148 |
| 6,201,828 B1 | * | 3/2001 | El-Tarhuni et al. | 375/150 |
| 6,549,559 B2 | * | 4/2003 | Kamgar et al. | 375/134 |

FOREIGN PATENT DOCUMENTS

| | | |
|---|---|---|
| EP | 0849887 A2 | 6/1998 |
| EP | 0966110 A2 | 12/1999 |

OTHER PUBLICATIONS

"Simulation and Implementation of a Rake Receiver for Direct Sequence spread Spectrum WLAN–Terminals", D. Hunold, Master's Thesis, Stockholm, Oct. 25, 1996, Royal Institute of Technology, Kista, Sweden, Abstract and pp. 53–59.

* cited by examiner

*Primary Examiner*—Stephen Chin
*Assistant Examiner*—Lawrence B Williams
(74) *Attorney, Agent, or Firm*—Aaron Waxler

(57) ABSTRACT

A resolved component of a multi-path signal is assigned to a rake finger of a spread spectrum rake receiver. The resolved component is variably delayed. On the variably delayed resolved component, an early-late detection is performed so as to determine whether the resolved component arrived early or late with respect to an optimum arrival time. A first pulse is generated if the early-late detection determines that said resolved component arrived early. A second pulse is generated if the early-late detection determines that the resolved component arrived late. The first and second pulses are counted. The first pulse causes counting in a first direction and the second pulse causes counting in a second direction. From the counting, a fractional-chip delay timing adjustment signal is derived, and fed back to adjust the variably delaying of the resolved component. Also from the counting a chip delay phase adjustment signal is derived, and fed back to control a phase of a pseudo-noise generator.

15 Claims, 3 Drawing Sheets

TRACKING OF A MULTI-PATH RESOLVED SIGNAL IN A RAKE RECEIVER

BACKGROUND OF THE INVENTION

1. Field of the Invention

The present invention relates to a method of tracking a resolved component of a multi-path signal assigned to a rake finger of a spread spectrum rake receiver, more particularly to such a rake receiver included in a spread spectrum communication device such as a CDMA handset.

2. Description of the Related Art

Cellular communication systems are well-known. Such cellular communication systems comprise cells or radio zones, together covering a given geographical area. The cells include base stations that, through control and communication channels, establish and maintain communication links with mobile communication devices that are comprised in the system, and communicate with the mobile communication devices through established communication links.

One type of a cellular communication system is a so-called Direct Sequence CDMA (Code Division Multiple Access) spread spectrum system. In such a CDMA spread spectrum system, in addition to a transmitter, the mobile communication device typically has a so-called rake receiver with a number of rake fingers to resolve components of a multi-path received spread spectrum signal and to diversity combine resolved components so as to improve the signal-to-noise ratio of the received signal. The spread spectrum signals are received from transmitters that spread data signals over a frequency band by using spreading sequences. Elements in such a sequence are so-called chips. For spreading different data signals at different transmitters Walsh sequences are used for channelization and pseudo-noise-spreading sequences are used for scrambling. The rake receiver regenerates a data signal from a received spread spectrum signal by de-scrambling it with the same pseudo-noise sequence and by de-spreading it thereafter with the same Walsh sequence that was used to spread the data signal, and diversity combines multi-path received signals that originate from the same data signal. The rake receiver needs to initially synchronize to the transmitter from which it wants to receive a data signal. During such initial synchronization, a searcher comprised in the rake receiver resolves components of a multi-path received signal, the components originating from the wanted data signal. Thereafter, the rake receiver adopts a tracking mode synchronization to keep the rake fingers synchronized to the resolved components that originate from the same wanted data signal. During tracking mode synchronization the rake fingers are kept aligned with their resolved components.

SUMMARY OF THE INVENTION

It is an object of the invention to provide a rake receiver in which during tracking mode synchronization the rake fingers are kept aligned with their resolved components of a multi-path signal while using simple alignment means.

It is another object of the invention to provide a rake receiver with alignment means that require a limited amount of memory.

It is still another object of the invention to provide a rake receiver with reduced power consumption.

In accordance with the invention, a method of tracking a resolved component of a multi-path signal assigned to a rake finger of a spread spectrum rake receiver is provided, said method comprising:

variably delaying said resolved component;

performing an early-late detection on said variably delayed resolved component so as to determine whether said resolved component arrived early or late with respect to an optimum arrival time, and generating a first pulse if said early-late detection determines that said resolved component arrived early and generating a second pulse if said early-late detection determines that said resolved component arrived late;

counting said first and second pulses, said first pulse causing counting in a first direction and said second pulse causing counting in a second direction;

deriving from said counting a fractional-chip delay timing adjustment signal, and feeding back said derived fractional-chip delay timing adjustment signal to adjust said variably delaying of said resolved component, and deriving from said counting a chip delay phase adjustment signal, and feeding back said derived chip delay phase adjustment signal to control a phase of a pseudo-noise generator.

The invention is based upon the insight that by distributing multi-path alignment over timing alignment of a variable delay and phase alignment of the pseudo-noise generator, a simple variable delay arrangement may be used to provide the variable delay.

In an embodiment, a shift register implements the variable delay. Due to the invention, the shift register may be made very short and typically has only eight sections.

Advantageously, at least part of the variable delay is obtained as a bulk delay of an adjustable digital filter. Herewith, the length of the shift register may even be further reduced to typically two or four samples per chip. Reduction of samples, and thereby clock rates in the receiver, and reduction of complexity achieves reduced power consumption and reduced chip area. The delay of the digital filter may be adjusted by selecting filter coefficients from a look-up table, entries of the look-up table comprising filter coefficients representing predetermined delays.

In an embodiment, counters do counting of pulses generated by early-late detection. A first counter counts the pulses so as to obtain the fractional-chip delay timing adjustment signal, and, at chip boundary, provides a carry signal to a second counter. The second counter provides the chip delay phase adjustment signal to control a phase of the pseudo-noise generator.

BRIEF DESCRIPTION OF THE DRAWINGS

Throughout the figures the same reference numerals are used for the same features.

DESCRIPTION OF THE DETAILED EMBODIMENTS

Figure 1:
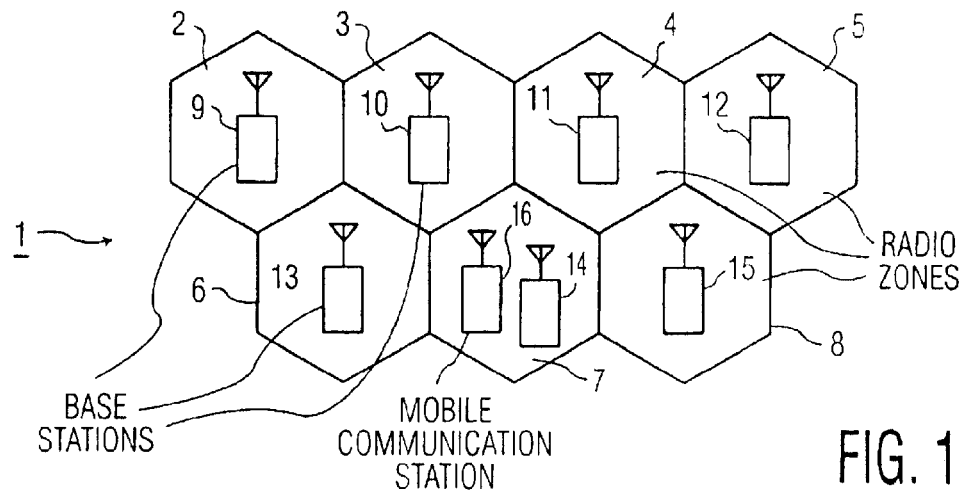
FIG. 1 schematically shows a CDMA spread spectrum system.

FIG. 1 schematically shows a CDMA spread spectrum system 1. The system 1 comprises radio zones 2–8, each respectively comprising base stations 9–15. A mobile communication device 16 is comprised in the radio zone 7. The mobile communication device 16 may be a cell phone or handset, or any other suitable mobile communication device. In the example given, the system 1 is a direct sequence spread spectrum system, and the mobile communication device 16 comprises a rake receiver as shown in further detail in FIG. 3. Groups of radio base stations are coupled to switching centers (not shown), and the switching centers are coupled to each other.

Figure 2:
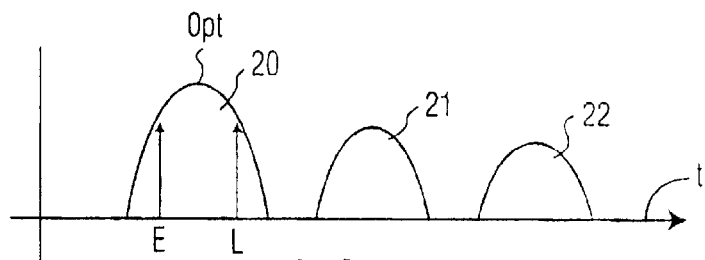
FIG. 2 shows resolved components of a multi-path signal, and early/late signals.

FIG. 2 shows resolved components 20–22 of a multi-path signal, and early/late signals E and L. Upon initial synchronization of the mobile communication device 16 to the system, at power-on of the device 16, a searcher (not shown in detail) resolves the components 20–22 from the system 1, and allocates the resolved components 20–22 to rake fingers of the rake receiver. Such initial synchronization is well-known in the art. Thereafter, the rake fingers adopt a tracking mode synchronization wherein each rake finger is aligned and is kept aligned to its resolved component. The early/late signals E and L represent respective current situations wherein a rake finger receives a multi-path component early or late with respect to an optimum reception time of maximum signal energy 23.

Figure 3:
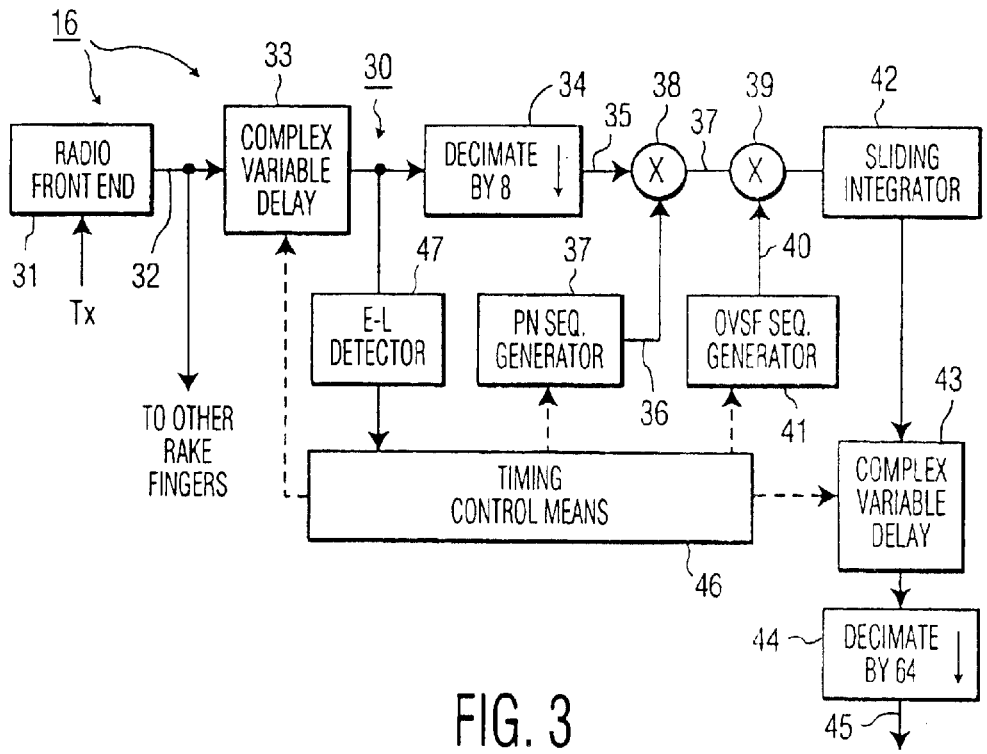
FIG. 3 shows a communication device with a rake finger in such a rake receiver, according to the invention.

FIG. 3 shows the communication device 16 with a rake finger 30 in such a rake receiver according to the invention. The rake receiver diversity combines resolved components of a multi-path signal to form a diversity combined signal that is supplied to a symbol detector. The communication device 16 comprises a radio transmission and reception front end 31 and a plurality of rake fingers of which the rake finger 30 is shown. The radio front end 31 provides the usual reception, down-mixing, signal sampling, and transmission tasks, and provides a complex input signal 32 to the rake fingers, a sampled base band signal. In principle, the complex input signal can also be a low-intermediate frequency signal. A transmission branch is indicated by Tx. For the purpose of the invention only the rake finger 30 is shown in further detail. A processing means processes the complex input signal 32. Such processing means could be hard-wired logic or could be DSP (Digital Signal Processor) firmware, or a software program. In the embodiment shown, the rake finger 30 comprises a complex variable delay arrangement 33 that delays the complex input signal over maximally 8 samples of the complex input signal 32, a chip containing 8 samples. The complex variable delay 33 provides fractional-chip delay of the complex input signal 32. Once the correct fractional-chip delay has been applied, the delayed signal is immediately down-sampled to one sample per chip, by down-sampling means that decimate the delayed signal by eight. A down-sampled signal 35 is next multiplied by the complex conjugate of a complex PN (Pseudo-Noise) sequence 36 which is generated by a pseudo-noise generator 37. At chip-boundary, the complex PN sequence is adjusted in phase to match the resolved component in the complex input signal 32. A resulting de-scrambled signal 37 that is provided by a multiplier 38 is then multiplied by a multiplier 39 with an orthogonal variable spreading factor code (OVSF) generated by an OVSF sequence generator 41, such an OVSF code being equivalent to a Walsh code. The phase of the OVSF code is also controlled by the shown delay locked loop, providing both fractional-chip and chip-boundary control signals. Next, a sliding integrator 42 provides a sliding integration over the length of the OVSF code 40, in the embodiment given over sixty four chips. After integration, a complex variable delay 43 provides delay equalization to the nearest integer number of symbols, before decimation by sixty four to the symbol rate by down-sampling means 44. As usual, and finally, to produce an output, a de-spread signal 45 is multiplied by the complex conjugate of a channel tap estimate obtained from a pilot channel broadcast by a base station, e.g., the base station 14. Timing control means 46 provides delay control signals to the complex variable delays 33 and 43, and phase control signals to the PN sequence generator 37 and to the OVSF sequence generator 41. The rake finger 30 further comprises an early/late detector 47 that provides power estimate signals of the early and late signals E and L to the timing control means 46.

Figure 4:
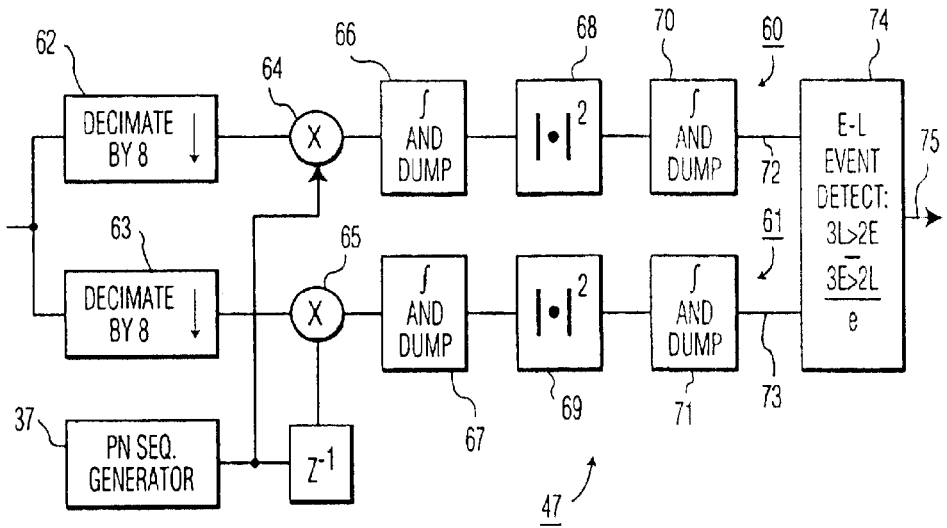
FIG. 4 shows an early/late detector in a rake finger of a mobile communication device according to the invention.

FIG. 4 shows the early/late detector 47 in the rake finger 30 of the mobile communication device 16 according to the invention. The early/late detector 47 has respective early and late branches 60 and 61. The early/late timing detector 47 is used to derive a feedback signal for the timing loop. Two decimation-by-eight operations are done by respective down-samplers 62 and 63, at different timing offsets. The timing offsets are chosen at a sample separation of a fraction of a chip. Both early and late branches 60 and 61 are de-scrambled by multiplication with the complex conjugate of the scrambling PN sequence, by respective multipliers, and then respectively integrated over a finite period using integrate-and-dump operations 66 and 67. The complex magnitude squared is then taken in both branches 60 and 61, by squarer arrangements 68 and 69 to enable subsequent non-coherent integration by means of further integrate-and-dump operations 70 and 71 providing power estimate signals 72 and 73 of the early and late signals E and L. A timing error signal e is derived in the processing block 74 using the following logic: if three times the power estimate signal of the signal E is greater than two times the power estimate signal of the signal L then e=−1, else if three times the power estimate signal of the signal L is greater than two times the power estimate signal of the signal E then e=+1, else e=0. There is thus a dead zone in the range 2/3<=power estimate of E divided by power estimate of L<=3/2, <=indicating smaller than or equal to. The timing error events of the early and late signals are available from the output of the early/late detector 47 pulses 75, either positive or negative unit pulses depending on the direction of the error. The pulses 75 are counted in the timing control means 46 by properly configured up/down counters to derive the various timing control signals needed for the rake finger 30.

Figure 5:
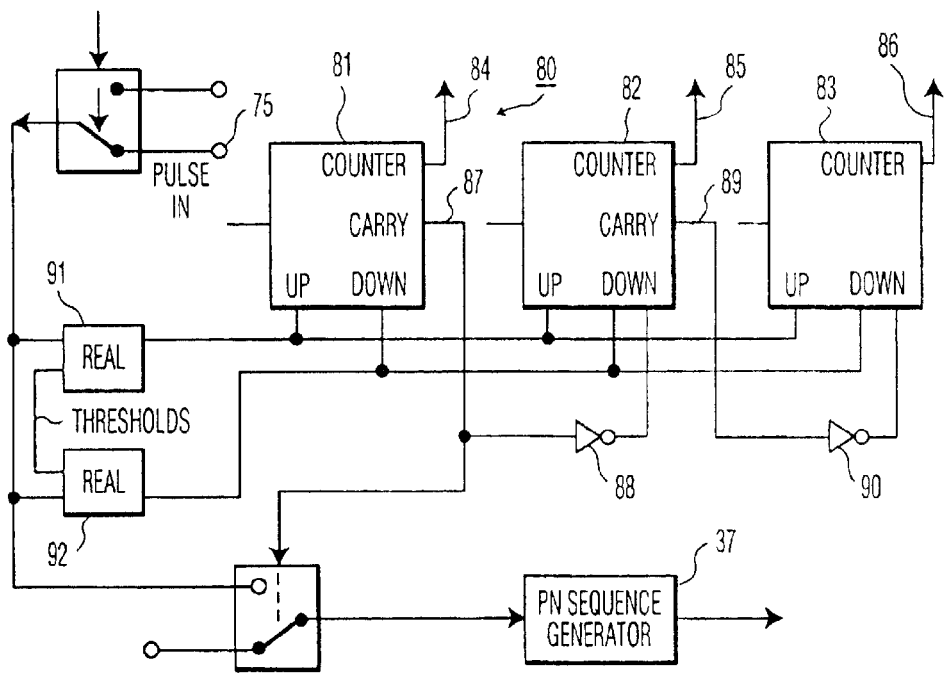
FIG. 5 shows a counter arrangement in a rake finger according to the invention.

FIG. 5 shows a counter arrangement in the rake finger 30 according to the invention. The counter arrangement comprises up/down counters 81, 82 and 83 which respectively provide control signals 84, 85 and 86. A counter carry signal 87 of the counter 81 is provided to a hold input of the counter 82 via an inverter 88, and a counter carry signal 89 of the counter 82 is provided to a hold input of the counter 83 via an inverter 90. The positive and negative unit pulses 75 are separated by means of comparators 91 and 92, and supplied to respective up and down count inputs of the counters 81–83. The counters 81–83 are clocked according to an initial delay estimate (as provided through initial synchronization to the system 1). The initial estimate is loaded into a counter which then decrements to zero. During the time that the counter value is greater than zero, a control input to the counter chain 81–83 and PN sequence generator 37 is held at logic '1' causing them to advance to the value which was preloaded. After this time, the control input is switched to the output of the early-late event detector 47. Equivalent functionality can be obtained by using presetable counters and a presetable PN sequencer. The up/down counters 81–83 are sample, chip and symbol counters, respectively, with cycle count values equal to the number of samples per chip, the number of chips per symbol and the number of symbols per frame respectively. The output or control signals 84, 85 and 86 are thus a sample delay control signal which controls the complex variable delay 33 at fractional-chip delay, a chip delay control signal which controls the slewable OVSF sequence generator 41, and a symbol delay control signal which is used outside the rake finger 30 for symbol alignment prior to maximal ratio combining of output signals of different rake fingers. The PN sequence generator 37 is a complex conjugate PN source containing slewable PN generators which form the real and imaginary parts of the complex PN source. The complex conjugate is obtained by negating the polarity of the imaginary output. The PN generator blocks accept a control input of +1 or −1 to advance or retard the generator phase by one chip, i.e., the PN generator is only shifted when the sample clock rolls over from one chip to another.

Once the values of the sample delay control signal, the chip delay control signal, and the symbol delay control signal are available, it becomes possible to derive the timing control values needed inside the rake finger 30. The following equations are implemented in the timing control means:

the complex variable delay 33 is set to $\delta_1 = N_S - 1 =$ value of the sample delay control signal, where $N_S$ is the number of samples per chip;

the phase of the slewable OVSF generator 41 is set to minus the value of the chip delay control signal;

the complex variable delay 43 is set to $= N_w - 1 =$ value of the chip delay control signal, where $N_w$ is the number of chips per Walsh symbol; and the total delay computed by the rake finger 30 is:

$d_{total}$ = value of the sample delay control signal $+ N_S$ times the value of the chip delay control signal $+ N_S$ times $N_w$ times the value of the symbol delay control signal.

In the described embodiment, an oversampling rate of between four and eight samples is used. In another embodiment, using adjustable FIR-filters to produce the timing delay, the oversampling rate and thereby power consumption is advantageously reduced.

Figure 6:
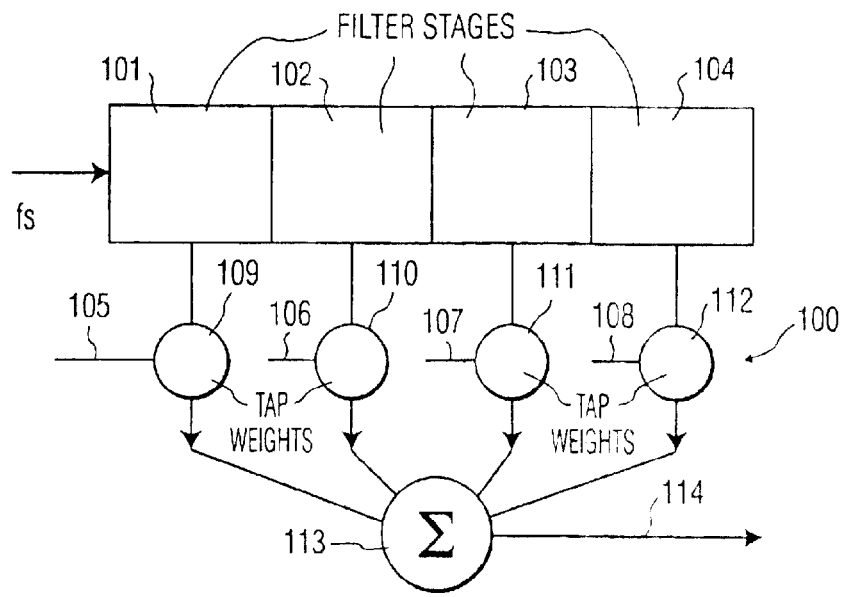
FIG. 6 shows an adjustable digital FIR filter in a rake finger according to the invention.

FIG. 6 shows an adjustable digital FIR filter 100 in another embodiment of the rake finger 30 according to the invention. The filter 100 is used to at least produce a part of the fractional-chip or sub-chip delay. To this end the bulk delay of the filter 100 is selected. In this way a rake finger is built which requires only two or four samples per chip at its input. Depending on the architecture of analog-converters contained in the front-end 31 and the receiver's tolerance to aliasing, the maximum sampling rate used by the CDMA receiver could thereby be reduced. In the embodiment shown, the adjustable digital FIR (Finite Impulse Response) filter 100 has four filter stages 101–104 with a pre-computed set of FIR tap coefficients 105–108 which set tap weights 109–112 of the filter 100. Using a summing stage 113, outputs of the weighted filter stages are summed to produce a filter output signal 114.

Figure 7:
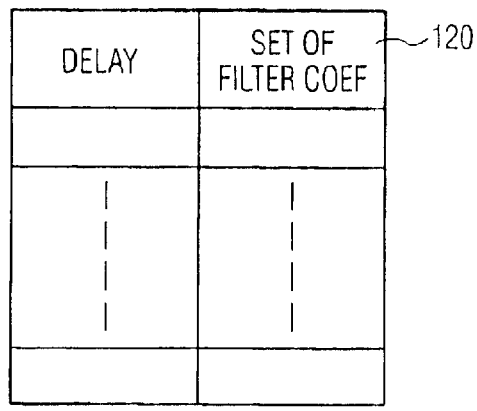
FIG. 7 shows a look-up table with filter tap coefficients for a FIR filter.

FIG. 7 shows a look-up table 120 with entries of filter tap coefficients 105–108 for the FIR filter 100, for a desired bulk delay. Each set of FIR filter coefficients has a pre-determined group delay while acting as a low pass filter. The FIR filter coefficients are directly synthesized using an inverse Fast Fourier Transform from the desired response. For easy of calculation, the frequency response is assumed to be an ideal low pass filter with a cliff-edge at half the Nyquist frequency. The phase is assumed to be linear with the slope depending on the required group delay.

Using the above principles, the following is an example of filter coefficients suitable for time shifting.

| | | | | |
|---|---|---|---|---|
| 0.2207 | 0.3560 | 0.3560 | 0.2207 | 0.0293 |
| 0.1976 | 0.3455 | 0.3642 | 0.2428 | 0.0524 |
| 0.1738 | 0.3329 | 0.3702 | 0.2639 | 0.0762 |
| 0.1495 | 0.3183 | 0.3738 | 0.2836 | 0.1005 |
| 0.1250 | 0.3018 | 0.3750 | 0.3018 | 0.1250 |
| 0.1005 | 0.2836 | 0.3738 | 0.3138 | 0.1495 |
| 0.0762 | 0.2639 | 0.3702 | 0.3329 | 0.1738 |
| 0.0524 | 0.2428 | 0.3642 | 0.3455 | 0.1976 |
| 0.0293 | 0.2207 | 0.3560 | 0.3560 | 0.2207 |

Figure 8:
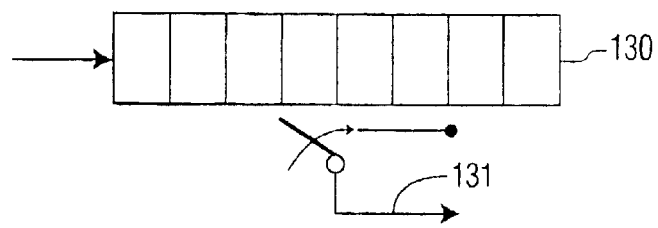
FIG. 8 shows a controllable shift register in a rake finger according to the invention.

FIG. 8 shows a clocked controllable shift register 130 in the rake finger 30 according to the invention, as an embodiment of a real part of the complex variable delay 33. The register 130 has eight shift register sections. The shift register maximally contains eight samples of the input signal 32. In order to generate the desired fractional-chip delay, an output 131 of the register 130 is coupled to an appropriate shift register section.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claimed is:

1. A method of tracking a resolved component of a multi-path signal assigned to a rake finger of a spread spectrum rake receiver, said method comprising:

variably delaying said resolved component over maximally a number of samples per chip in said complex input signal, and generating said chip delay phase adjustment signal by counting carry signals from fractional-chip counting during said counting, said fractional-chip counting causing said carry signals at a counting value representative of said number of tipples per chip;

performing an early-late detection on said variably delayed resolved component so as to determine whether said resolved component arrived early or late with respect to an optimum arrival time, and generating a first pulse if said early-late detection determines that said resolved component arrived early and generating a second pulse if said early-late detection determines that said resolved component arrived late;

counting said first and second pulses, said first pulse causing counting in a first direction and said second pulse causing counting in a second direction;

deriving from said counting a fractional-chip delay timing adjustment signal, and feeding back said derived fractional-chip delay timing adjustment signal to adjust said variably delaying of said resolved component, and deriving from said counting a chip delay phase adjustment signal, and feeding back said derived chip delay phase adjustment signal to control a phase of a pseudo-noise generator.

2. A method as claimed in claim 1, generating said fractional-chip delay timing adjustment signal from said fractional-chip counting.

3. A method as claimed in claim 1, performing said variably delaying by controlling a shift register using said fractional-chip delay timing adjustment signal.

4. A method as claimed in claim 1, performing said variably delaying by controlling a delay of a digital filter register using said fractional-chip delay timing adjustment signal.

5. A method as claimed in claim 4, performing said controlling of said delay by selecting filter coefficients of said digital filter.

6. A method as claimed in claim 5, selecting said filter coefficients from a look-up table, said look-up table comprising table entries with filter coefficients representing predetermined delays.

7. A method as claimed in claim 1, performing said variably delaying using said fractional-chip delay timing adjustment signal by combined controlling of a shift register and a delay of a digital filter register.

8. A rake receiver comprising:
   a rake finger of a spread spectrum rake receiver, said rake finger tracking a resolved component of a multi-path signal assigned to said rake finger, said rake finger comprising:
   means for variably delaying said resolved component over maximally a number of samples per chip in said complex input signal, and generating said chip delay phase adjustment signal by counting carry signals from fractional-chip counting during said counting, said fractional-chip counting causing said carry signals at a counting value representative of said number of samples per
   means for performing an early-late detection on said variably delayed resolved component so as to determine whether said resolved component arrived early or late with respect to an optimum arrival time, and means for generating a first pulse if said early-late detection determines that said resolved component arrived early and means for generating a second pulse if said early-late detection determines that said resolved component arrived late;
   means for counting said first and second pulses, said first pulse causing counting in a first direction and said second pulse causing counting in a second direction,
   means for deriving from said counting a fractional-chip delay timing adjustment signal, and for feeding back said derived fractional-chip delay timing adjustment signal to adjust said variably delaying of said resolved component, and
   means for deriving from said counting a chip delay phase adjustment signal, and for feeding back said derived chip delay phase adjustment signal to control a phase of a pseudo-noise generator.

9. A rake receiver comprising:
   a rake finger of a spread spectrum rake receiver, said rake finger tracking a resolved component of a multi-path signal assigned to said rake finger, said rake finger comprising:
   a variable delay arrangement configured to delay said resolved component;
   an early-late detector configured to perform an early-late detection on said variably delayed resolved component so as to determine whether said resolved component arrived early or late with respect to an optimum arrival time, and to generate a first pulse if said early-late detection determines that said resolved component arrives early and to generate a second pulse if said early-late detection determines that said resolved component arrives late;
   an adjustable pseudo-noise generator for generating a pseudo-noise sequence for de-scrambling said resolved component;
   a first counter configured to count said first and second pulses, said first counter providing a fractional-chip delay timing adjustment signal to said variable delay arrangement in order to provide time alignment of said rake finger with said resolved component; and
   a second counter configured to count carry signals generated by said first counter, said second counter providing a chip delay phase adjustment signal to said adjustable pseudo-noise generator in order to provide phase alignment of said rake finger with said resolved component.

10. A rake receiver as claimed in claim 9, wherein said variable delay arrangement is a shift register.

11. A rake receiver as claimed in claim 9, wherein said variable delay arrangement is a digital filter with an adjustable delay.

12. A rake receiver as claimed in claim 11, wherein said adjustable delay is set through selection of filter coefficients.

13. A rake receiver as claimed in claim 12, wherein said filter coefficients are selected from a look-up table comprised in said rake receiver, said look-up table having entries of filter coefficients corresponding to predetermined delays.

14. A rake receiver as claimed in claim 9, wherein said variable delay arrangement is a combination of a shift register and a digital filter with an adjustable delay.

15. A spread spectrum communication system having a plurality of cells with base stations covering said cells, with a mobile communication device for communicating with one of said base stations, said mobile communication device having a rake receiver with a rake finger, said rake finger tracking a component of a multi-path signal assigned to said rake finger, said rake finger comprising:
   means for variably delaying said resolved component over maximally a number of samples per chip in said complex input signal, and generating said chip delay phase adjustment signal by counting carry signals from fractional-chip counting during said counting, said fractional-chip counting causing said carry signals at a counting value representative of said number of samples per chip;
   means for performing an early-late detection on said resolved component so as to determine whether said resolved component arrived early or late with respect to an optimum arrival time, and means for generating a first pulse if said early-late detection determines that said resolved component arrived early and means for generating a second pulse if said early-late detection determines that said resolved component arrived late;
   means for counting said first and second pulses, said first pulse causing counting in a first direction and said second pulse causing counting in a second direction;
   means for deriving from said counting a fractional-chip delay timing adjustment signal, and for feeding back said derived fractional-chip delay timing adjustment signal to adjust said variably delaying of said resolved component, and
   means for deriving from said counting a chip delay phase adjustment signal, and for feeding back said derived chip delay phase adjustment signal to control a phase of a pseudo-noise generator.

* * * * *